United States Patent Office 3,803,248
Patented Apr. 9, 1974

3,803,248
PROCESS FOR INCREASING THE ALPHA NAPHTHOL PURITY OF A MIXTURE CONTAINING ALPHA AND BETA NAPHTHOLS
John D. Bacha and Charles M. Selwitz, Monroeville, Pa., assignors to Gulf Research & Development Company, Pittsburgh, Pa.
No Drawing. Filed Dec. 4, 1972, Ser. No. 311,626
Int. Cl. C07c 37/22
U.S. Cl. 260—621 A    5 Claims

ABSTRACT OF THE DISCLOSURE

A process for increasing the alpha naphthol purity of a mixture containing alpha and beta naphthols which involves treating such mixture with carbon tetrachloride.

---

This invention relates to a process for increasing the alpha naphthol purity of a mixture containing alpha and beta naphthols.

When alpha naphthols are prepared by conventional processes, they are often obtained with contaminating amounts of beta naphthols. For example, naphthalene can be subjected to oxychlorination with HCl in the presence of nitrate ions, as, for example, in U.S. Pat. No. 3,591,644 to obtain a product mixture containing from about 90 to about 95 weight percent alpha chloronaphthalene and from about five to about ten weight percent beta chloronaphthalene. By conventional hydrolysis this product mixture can be converted to the corresponding naphthols.

Alpha naphthol is used as a reactant with methylisocyanate to prepare N-methylcarbamate. The purity of alpha naphthol required in such process is exceedingly high, in some cases as high as about 99.5 weight percent.

We have found that the alpha naphthol purity of a mixture containing alpha and beta naphthols can be appreciably increased by treating such mixture with carbon tetrachloride.

The process defined herein can be used to increase the alpha naphthol purity of any mixture containing alpha and beta naphthols. In general, most such mixtures will contain at least about 70 weight percent alpha naphthol and in most cases above about 90 weight percent alpha naphthol. Insofar as the minimum amount of beta naphthols in the mixture to be treated is concerned theoretically any mixture containing any amount of beta naphthols, however small, can be treated.

Initially, the impure mixture and carbon tetrachloride are brought together and contact therebetween is maintained for about 0.01 to about 100 hours, preferably for about 0.1 to about 1.0 hour, at a temperature of about $-20°$ to about $100°$ C., preferably at a temperature of about $10°$ to about $77°$ C., and a pressure of about 0 to about 1000 pounds per square inch gauge, preferably about 0 to about 50 pounds per square inch gauge. To facilitate contact between the mixture and carbon tetrachloride, stirring can be used. The weight ratio of carbon tetrachloride to alpha naphthol in the mixture being treated can be varied over wide ranges, for example, in the range of about 2:1 to about 30:1, but preferably is maintained in the range of about 5:1 to about 20:1.

From the resultant solution there is removed at a temperature of about $0°$ to about $40°$ C., preferably about $15°$ to about $30°$ C., and a pressure of about 0 to about 1000 pounds per square inch gauge, preferably a pressure of about 0 to about 50 pounds per square inch gauge, the solid material therein. This is preferably done by filtration. The solids so recovered will consist essentially of a mixture of alpha and beta naphthols whose alpha naphthol content on a weight percent basis is higher than in the crude mixture of alpha and beta naphthols being treated. In general from about 30 to about 95 weight percent of the original crude mixture of alpha and beta naphthols will be recovered as solids per pass. The liquid remaining will contain carbon tetrachloride and alpha and beta naphthols.

If desired, the solids so obtained can be subjected to further treatment with carbon tetrachloride, as defined above, to still further increase the alpha naphthol content thereof. Also, if desired, the remaining liquid defined above, for example, the recovered filtrate, when filtration is used, can also be treated to recover additional alpha naphthols therein. For example, the solution can be subjected to distillation to remove all of the carbon tetrachloride therefrom, leaving behind a residue containing alpha and beta naphthols. The residue so obtained can then be treated with carbon tetrachloride, as defined above, to increase the alpha naphthol content thereof. Alternatively, only sufficient carbon tetrachloride need be removed from the solution or filtrate to obtain a resultant solution containing the required ratio of carbon tetrachloride to alpha naphthol needed for purification, after which the purification process can continue as defined.

The process can further be illustrated from an examination of the data in Table I below wherein various mixtures of alpha and beta naphthols were introduced

TABLE I

| Run No. | $CCl_4$, grams | Crude naphthol composition before recrystallization | | Temperature of filtration, °C. | Weight percent of alpha naphthol in— | | Wt. percent of recrystallized mixture based on crude mixture |
|---|---|---|---|---|---|---|---|
| | | Alpha naphthol, gms. | Beta naphthol, gms. | | Mixture | Recrystallized mixture | |
| 1 | 159.4 | 8.25 | 1.04 | 22 | 88.2 | 99.4 | 72 |
| 2[1] | 63.7 | 4.175 | 0.025 | 22 | 99.4 | 99.96 | 71 |
| 3 | 1594.0 | 90.0 | 10.0 | 29 | 90.0 | 99.7 | 45.6 |
| 4 | 797.0 | 90.0 | 10.0 | 29 | 90.0 | 99.0 | 67.4 |
| 5 | 637.0 | 90.0 | 10.0 | 23 | 90.0 | 97.2 | 80.8 |
| 6 | 159.4 | 9.0 | 1.0 | 25 | 90.0 | 99.66 | 52.1 |
| 7 | 159.4 | 9.0 | 1.0 | 25 | 90.0 | 99.60 | 52.3 |
| 8 | 127.0 | 9.0 | 1.0 | 25 | 90.0 | 99.3 | 59.8 |
| 9 | 797.0 | 45.0 | 5.0 | 25 | 90.0 | 99.5 | 55.6 |
| 10 | 127.0 | 7.2 | 0.8 | 15 | 90.0 | 99.23 | 64.5 |
| 11 | 127.0 | 7.2 | 0.8 | 20 | 90.0 | 99.65 | 60.0 |
| 12 | 127.0 | 7.2 | 0.8 | 25 | 90.0 | 99.66 | 54.3 |
| 13 | 127.0 | 7.2 | 0.8 | 30 | 90.0 | 99.72 | 44.0 |
| 14 | 159.4 | 7.5 | 2.5 | 30 | 75.0 | 92.75 | 33.0 |
| 15 | 159.4 | 7.5 | 2.5 | 25 | 75.0 | 91.30 | [2]48.1 |
| 16 | 159.4 | 7.5 | 2.5 | 25 | 75.0 | 91.42 | 40.3 |
| 17 | 159.4 | 7.5 | 2.5 | 20 | 75.0 | 91.80 | 58.7 |
| 18 | 127.0 | 7.5 | 2.5 | 25 | 75.0 | 90.00 | 53.4 |
| 19 | 191.3 | 7.5 | 2.5 | 25 | 75.0 | 91.87 | 34.9 |
| 20 | 159.4 | 7.5 | 2.5 | 25 | 75.0 | 92.30 | 41.0 |

[1] The charge for Run No. 2 was the recrystallized product recovered in Run No. 1.
[2] Cooled below filtration temperature and then allowed to warm to 25° C.

into varying quantities of carbon tetrachloride. The mixtures were warmed to temperatures of about 50° to about 77° C. to facilitate solution of the crude mixtures in carbon tetrachloride, after which the solutions were subjected to filtration at selected temperature levels to remove solid materials therefrom. The solids so recovered contained alpha naphthol and beta naphthols, with the weight percent of alpha naphthol being higher than in the crude mixtures being treated.

Each of the above runs shows that the alpha naphthol purity of a mixture containing alpha and beta naphthols can be increased by recrystallization of alpha naphthols from solution in carbon tetrachloride. Run Nos. 1 and 2 show that in a series of steps a crude mixture can be purified in accordance with the procedure defined herein to obtain a substantially purified alpha naphthol product. Run Nos. 3 to 5 illustrate the effect of the ratio of carbon tetrachloride to alpha naphthol and of filtration temperature on the purity of product obtained and of solids recovery. Run Nos. 6 and 7 were carried out to check on reproducibility of results. Run No. 9 is substantially a scale-up of run No. 8. The results in each case are comparable with each other. In run Nos. 10 to 13, decreasing the filtration temperature improved recovery of solids with minimal loss in purity. The series of run Nos. 14 to 20 show that a lower purity material can be upgraded herein and that lowering the filtration temperature is more beneficial in increasing selectivity and recovery of solids than decreasing the amount of solvent.

That carbon tetrachloride is unique in upgrading the alpha naphthol content of a mixture containing alpha and beta naphthols is apparent from the data in Table II below wherein mixtures containing alpha and beta naphthols were dissolved in a large number of diverse solvents and unsatisfactory results were obtained.

TABLE II

| Run No. | Solvent | Volume of solvent, ml. | Naphthol contacted with solvent, grams | | Solubility data | | | | Comments |
|---|---|---|---|---|---|---|---|---|---|
| | | | | | Alpha naphthol, grams | | Beta naphthol, grams | | |
| | | | Alpha | Beta | Dissolved | Undissolved | Dissolved | Undissolved | |
| 21 | Benzene | 5.0 | 1.00 | | 0.70 | 0.30 | | | Solubility too high. |
| 22 | do | 5.0 | | 1.00 | | | 0.21 | 0.79 | Do. |
| 23 | Heptane | 5.0 | 1.00 | | 0.16 | 0.984 | | | Solubility too low. |
| 24 | do | 5.0 | | 1.00 | | | 0.0034 | 99.9966 | Do. |
| 25 | Chloroform | 5.0 | 1.00 | | 0.855 | 0.145 | | | Solubilities too high. |
| 26 | do | 5.0 | | 1.00 | | | 0.348 | 0.652 | Do. |
| 27 | Ethyl acetate | 5.0 | 2.00 | | 2.00 | 0 | | | ⎫ |
| 28 | do | 5.0 | | 2.00 | | | 2.00 | 0 | ⎬ Excessive solubilities in oxygenated solvents. |
| 29 | Methanol | 5.0 | 2.00 | | 2.00 | 0 | | | ⎪ |
| 30 | do | 5.0 | | 2.00 | | | 2.00 | | ⎪ |
| 31 | t-Butanol | 5.0 | 2.00 | | 2.00 | 0 | | | ⎪ |
| 32 | do | 5.0 | | 2.00 | | | 2.00 | | ⎭ |
| 33 | Chlorobenzene | 5.0 | 2.00 | | | | | | ⎫ Visual inspection showed excessive solubilities. |
| 34 | do | 5.0 | | 2.00 | | | | | ⎭ |
| 35 | Cyclohexane | 5.0 | 2.00 | | Negligible | ~2.0 | | | Solubility too low. |
| 36 | do | 5.0 | | 2.0 | | | Negligible | ~2.0 | Do. |
| 37 | V, M and P naphtha | 5.0 | 0.89 | 0.11 | 0.0016 | ~0.89 | 0.00049 | ~0.11 | Do. |
| 38 | Water | 60 | 0.18 | 0.02 | | ~0.18 | | ~0.02 | Do. |
| 39 | Heptane | 100 | 9.0 | 1.0 | 0.60 | 8.40 | 0.10 | 0.90 | Alpha naphthol impurity unchanged at 90 percent. |
| 40 | Cyclohexane | 50 | 9.0 | 1.0 | 0.25 | 8.75 | 0.05 | 0.95 | Too little dissolved to change purity. |
| 41 | Trichloroethylene | 50 | 4.5 | 0.5 | 2.80 | 1.70 | 0.50 | 0 | Solubility too high. |
| 42 | Cl$_2$FCCFCl$_2$ | 30 | 2.7 | 0.3 | 0.5 | 2.2 | 0.1 | 0.2 | Purity relatively unchanged at 90 percent. |

Resort may be had to such variations and modifications as fall within the spirit of the invention and the scope of the appended claims.

We claim:
1. A process for increasing the alpha naphthol purity of a mixture containing alpha and beta naphthols, said mixture containing at least 70 percent alpha naphthol, which comprises dissolving said mixture in warm carbon tetrachloride, the weight ratio of carbon tetrachloride to the alpha naphthol in said mixture being treated being in the range of about 2:1 to about 30:1, and then cooling the carbon tetrachloride solution to a temperature of about 0° to about 40° C. and separating solids therefrom.
2. The process of claim 1 wherein said separation is in the temperature range of about 15° to about 30° C.
3. The process of claim 1 wherein the weight ratio of carbon tetrachloride to alpha naphthol in the mixture being treated is in the range of about 5:1 to about 20:1.
4. The process of claim 2 wherein the weight ratio of carbon tetrachloride to alpha naphthol in the mixture being treated is in the range of about 5:1 to about 20:1.
5. The process of claim 1 wherein the weight percent of alpha naphthol in the crude mixture being treated is at least about 90 percent.

References Cited
UNITED STATES PATENTS
1,996,745  4/1935  Britton et al. _____ 260—629 X
1,717,009  6/1929  Davis _____ 260—621 B
3,076,035  1/1963  Peck _____ 260—621 B LEON ZITVER, Primary Examiner
N. MORGENSTERN, Assistant Examiner